US012563541B2

(12) United States Patent  (10) Patent No.:  US 12,563,541 B2
Cao  (45) Date of Patent:  Feb. 24, 2026

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 354 days.

(21) Appl. No.: 18/003,173

(22) PCT Filed: Jul. 30, 2021

(86) PCT No.: PCT/CN2021/109501
§ 371 (c)(1),
(2) Date: Dec. 23, 2022

(87) PCT Pub. No.: WO2022/028318
PCT Pub. Date: Feb. 10, 2022

(65) Prior Publication Data
US 2023/0189237 A1  Jun. 15, 2023

(30) Foreign Application Priority Data

Aug. 6, 2020  (CN) .......................... 202010783500.2

(51) Int. Cl.
*H04W 24/10*  (2009.01)
*H04W 72/044*  (2023.01)
*H04W 72/542*  (2023.01)

(52) U.S. Cl.
CPC ....... *H04W 72/046* (2013.01); *H04W 72/542* (2023.01)

(58) Field of Classification Search
CPC . H04B 7/024; H04B 7/06956; H04W 72/046; H04W 72/542
See application file for complete search history.

(56) References Cited

U.S. PATENT DOCUMENTS

2018/0323845 A1* 11/2018 Chang ................. H04L 25/0224
2019/0037426 A1* 1/2019 Yu .......................... H04W 72/23
(Continued)

FOREIGN PATENT DOCUMENTS

CN  108667496 A  10/2018
CN  111200872 A  5/2020
(Continued)

OTHER PUBLICATIONS

China UNICOM: "Discussion on group based beam reporting", 3GPP Draft; R1-1711336, XP051305517.
International Search Report and Written Opinion mailed on Nov. 2, 2021, received for PCT Application PCT/CN2021/109501, filed on Jul. 30, 2021, 9 pages including English Translation.
(Continued)

*Primary Examiner* — Phuc H Tran
(74) *Attorney, Agent, or Firm* — XSENSUS LLP

(57)  ABSTRACT

Provided are an electronic device and method for wireless communication, and a computer-readable storage medium. The electronic device comprises: a processing circuit which is configured to: send downlink reference signal resource configuration information to a user equipment, so as to perform downlink beam scanning, wherein the downlink reference signal resource configuration information comprises information of a transmit receive point that transmits a downlink transmission beam; and receive a packet-based beam quality report from the user equipment, wherein the packet-based beam quality report is used for a network side to determine, for the user equipment, a group of downlink transmission beams which can be simultaneously transmitted and can be simultaneously received by the user equipment.

18 Claims, 11 Drawing Sheets

(56)  References Cited

U.S. PATENT DOCUMENTS

| | | | | |
|---|---|---|---|---|
| 2019/0053072 A1* | 2/2019 | Kundargi | .............. | H04W 16/28 |
| 2019/0141742 A1* | 5/2019 | Zhou | .................... | H04L 5/0064 |
| 2021/0281305 A1* | 9/2021 | Grant | .................. | H04W 24/08 |
| 2022/0095289 A1* | 3/2022 | Kang | ................... | H04W 72/23 |
| 2022/0240120 A1* | 7/2022 | Fan | ...................... | H04W 24/10 |

FOREIGN PATENT DOCUMENTS

| | | | |
|---|---|---|---|
| CN | 111314952 A | 6/2020 |
| EP | 3598662 A1 | 1/2020 |
| JP | 2020507241 A | 3/2020 |
| JP | 2020516189 A | 5/2020 |
| WO | WO-2019047953 A1 | 3/2019 |
| WO | 2019/164363 A1 | 8/2019 |

OTHER PUBLICATIONS

CATT, "Details of downlink beam management", 3GPP TSG RAN WG1 Meeting #88bis, R1-1704551, Apr. 3-7, 2017, 3 pages.
Samsung, "Summary of email Discussion for Rel. 17 enhancements on MIMO for NR", 3GPP TSG RAN Meeting #86, RP-192435, Dec. 9-12, 2019, 31 pages.
Media Tek Inc., "Enhancements on multi-beam operations", 3GPP TSG RAN WG1 #98, R1-1908380, Aug. 26-30, 2019, Prague, CZ.
Zte, "Preliminary views on further enhancement for NR MIMO", 3GPP TSG RAN WG#1, Meeting #101-e, R1-2003483, May 25-Jun. 5, 2020.
ZTE, "Further details on multi-beam/TRP operation", 3GPP TSG RAN WG1 Meeting #98bis, Chongqing, China, Oct. 14-20, 2019, R1-1910287, XP051808481, pp. 1-16.

* cited by examiner

TRP#0

TRP#0

TRP#1

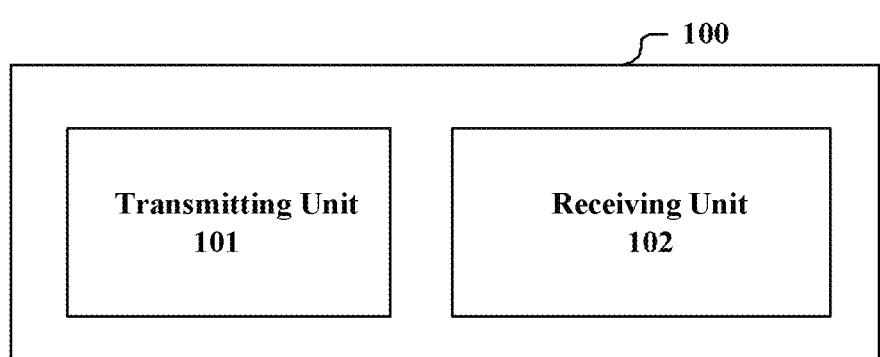

Figure 3

```
nzp-CSI-RS-SSB               SEQUENCE {
     nzp-CSI-RS-ResourceSetList  SEQUENCE (SIZE (1..maxNrofNZP-CSI-RS-ResourceSetsPerConfig)) OF NZP-CSI-RS-
ResourceSetId    OPTIONAL, -- Need R
     csi-SSB-ResourceSetList     SEQUENCE (SIZE (1..maxNrofCSI-SSB-ResourceSetsPerConfig)) OF CSI-SSB-
ResourceSetId OPTIONAL   -- Need R
}

NZP-CSI-RS-ResourceSet ::=       SEQUENCE {
     nzp-CSI-ResourceSetId           NZP-CSI-RS-ResourceSetId,
     nzp-CSI-RS-Resources            SEQUENCE (SIZE (1..maxNrofNZP-CSI-RS-ResourcesPerSet)) OF NZP-CSI-RS-
ResourceId,
     repetition                      ENUMERATED { on, off } OPTIONAL,   -- Need S
     aperiodicTriggeringOffset       INTEGER(0..6) OPTIONAL,   -- Need S
     trs-Info                        ENUMERATED {true}
     controlResourceSetId            ControlResourceSetId                      OPTIONAL  -- Need S
}
```

Figure 4

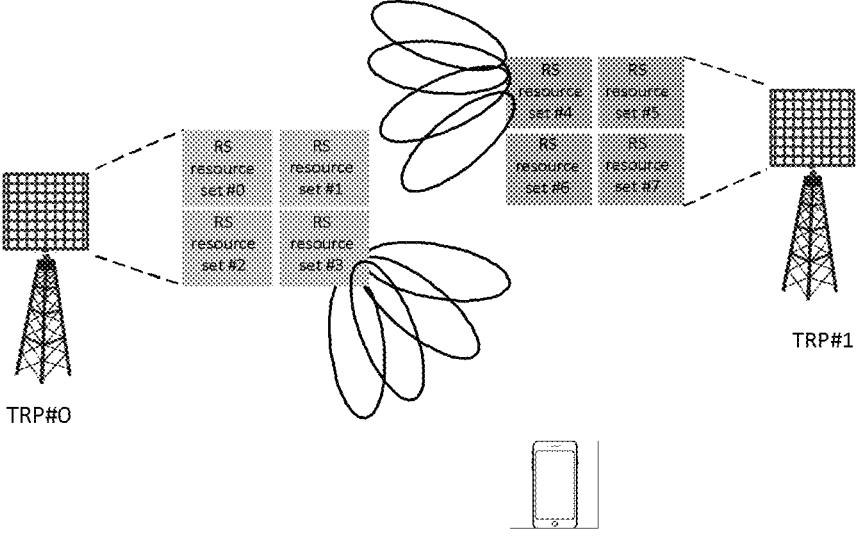

ELECTRONIC DEVICE AND METHOD FOR WIRELESS COMMUNICATION, AND COMPUTER-READABLE STORAGE MEDIUM

CROSS-REFERENCE TO RELATED APPLICATIONS

This application is based on PCT filing PCT/CN2021/109501, filed Jul. 30, 2021, which claims priority to Chinese Patent Application No. 202010783500.2, titled "ELECTRONIC DEVICE AND METHOD FOR WIRELESS COMMUNICATION, AND COMPUTER-READABLE STORAGE MEDIUM", filed on Aug. 6, 2020 with the China National Intellectual Property Administration, the entire contents of each of which are incorporated herein by reference in its entirety.

FIELD

The present disclosure relates to the field of wireless communications, and in particular to a group-based beam reporting mechanism. More specifically, the present disclosure relates to an electronic apparatus and a method for wireless communications, and a computer-readable storage medium.

BACKGROUND

In order to allocate an appropriate channel to user equipment (UE), a network side (NW) performs downlink beam scanning for the UE based on a downlink reference signal such as a channel state information reference signal (CSI-RS) and a synchronization signal block (SSB). The UE uses a receiving beam to measure the downlink reference signal to obtain a measurement result of the beam quality of a corresponding downlink emitting beam, and reports the measurement result to the network side. The network side indicates a downlink emitting beam to be applied for the user equipment based on the reported measurement result. For example, in a millimeter wave band, multiple beams may be used simultaneously for communication. The network side here may refer to various base stations (gNB or eNB) or transmit receive points (TRPs).

For example, the UE may support group-based beam quality reporting, that is, a group (such as 2) of downlink emitting beams is reported, and the UE may use 1 or 2 receiving beams to receive the group of downlink emitting beams simultaneously. However, it is uncertain whether the network side can emit this group of downlink emitting beams at the same time. This is because, generally speaking, one antenna panel (either on the network side or the UE side) can only emit one emitting beam or one receiving beam at the same time. If a group of downlink emitting beams is from the same antenna panel, the network side cannot emit these downlink emitting beams at the same time, and only single beam operation may be performed at this time, as shown in an example in FIG. 1. The network side is represented by TRP #0, and has four antenna panels #0 to #3. It is assumed that the UE reports downlink emitting beams Tx beam #1 and Tx beam #2 that may be received by the UE simultaneously. Since the two downlink emitting beams are both emitted by the antenna panel #3 of TRP #0, actually, they cannot be emitted simultaneously. In other words, although the UE performs the group-based beam quality reporting, it may only perform the single beam operation.

In addition, for a scenario with multiple TRPs, even if a group of downlink emitting beams reported are transmitted by different antenna panels, these antenna panels may belong to the same TRP, so simultaneous transmission of multiple TRPs cannot be achieved, as shown in the example in FIG. 2. TRP #0 and TRP #1 have four antenna panels respectively, and it is expected to achieve simultaneous transmission of TRP #0 and TRP #1 with respect to the UE. It is assumed that the UE reports downlink emitting beams Tx beam #0 and Tx beam #2 that may be received by the UE simultaneously, and the downlink emitting beams Tx beam #0 and Tx beam #2 are emitted by antenna panels #3 and #1 of TRP #0 respectively. However, since these downlink emitting beams are all from the same TRP, simultaneous transmission of TRP #0 and TRP #1 cannot be realized.

In order to solve the above problems, it is desirable to provide an improved group-based beam reporting mechanism.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: transmit, to user equipment, downlink reference signal resource configuration information to be used for downlink beam scanning, the downlink reference signal resource configuration information including information of a Transmit Receive Point (TRP) emitting a downlink emitting beam; and receive, from the user equipment, group-based beam quality report, the group-based beam quality report being used by a network side to determine, for the user equipment, a group of downlink emitting beams which can be emitted simultaneously and can be received by the user equipment simultaneously.

According to another aspect of the present disclosure, a method for wireless communications is provided. The method includes: transmitting, to user equipment, downlink reference signal resource configuration information to be used for downlink beam scanning, the downlink reference signal resource configuration information including information of a Transmit Receive Point (TRP) emitting a downlink emitting beam; and receiving, from the user equipment, group-based beam quality report, the group-based beam quality report being used by a network side to determine, for the user equipment, a group of downlink emitting beams which can be emitted simultaneously and can be received by the user equipment simultaneously.

According to an aspect of the present disclosure, an electronic apparatus for wireless communications is provided. The electronic apparatus includes processing circuitry. The processing circuitry is configured to: receive, from a network side, downlink reference signal resource configuration information to be used for downlink beam scanning, the downlink reference signal resource configuration information including information of a Transmit Receive Point (TRP) emitting a downlink emitting beam; and transmit, to the network side, group-based beam quality report, the group-based beam quality report being used by the network side to determine, for the user equipment, a group of downlink emitting beams which can be emitted simultaneously and can be received by the user equipment simultaneously.

According to another aspect of the present disclosure, a method for wireless communications is provided. The method includes: receiving, from a network side, downlink reference signal resource configuration information to be used for downlink beam scanning, the downlink reference signal resource configuration information including information of a Transmit Receive Point (TRP) emitting a downlink emitting beam; and transmitting, to the network side, group-based beam quality report, the group-based beam quality report being used by the network side to determine, for the user equipment, a group of downlink emitting beams which can be emitted simultaneously and can be received by the user equipment simultaneously.

According to other aspects of the present disclosure, there are further provided computer program codes and computer program products for implementing the methods for wireless communications above, and a computer-readable storage medium having recorded thereon the computer program codes for implementing the methods for wireless communications described above.

With the electronic apparatus and the method according to embodiments of the present disclosure, both the network side and the user equipment can acquire knowledge of information of a TRP emitting a downlink emitting beam, thereby ensuring that the network side can determine, for the user equipment, a group of downlink emitting beams which can be emitted simultaneously and can be received by the user equipment simultaneously.

These and other advantages of the present disclosure will be more apparent from the following detailed description of preferred embodiments of the present disclosure in conjunction with the accompanying drawings.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 3 is a block diagram showing functional modules of an electronic apparatus for wireless communications according to an embodiment of the present disclosure;

FIG. 4 shows a schematic diagram of pseudo codes for configuring CSI-RS resources through RRC signaling;

FIG. 5 shows an example in which different antenna panels correspond to different downlink reference signal resource sets;

FIG. 16 is a block diagram showing an example of an exemplary configuration of a smartphone to which the technology according to the present disclosure may be applied;

DETAILED DESCRIPTION

Figure 1:
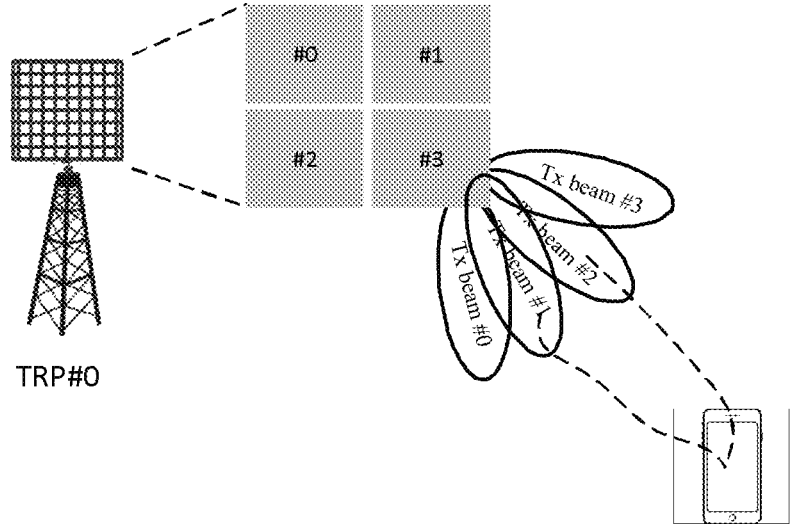
FIG. 1 is a schematic diagram showing an example in which two downlink emitting beams reported by UE come from the same antenna panel.
Figure 2:
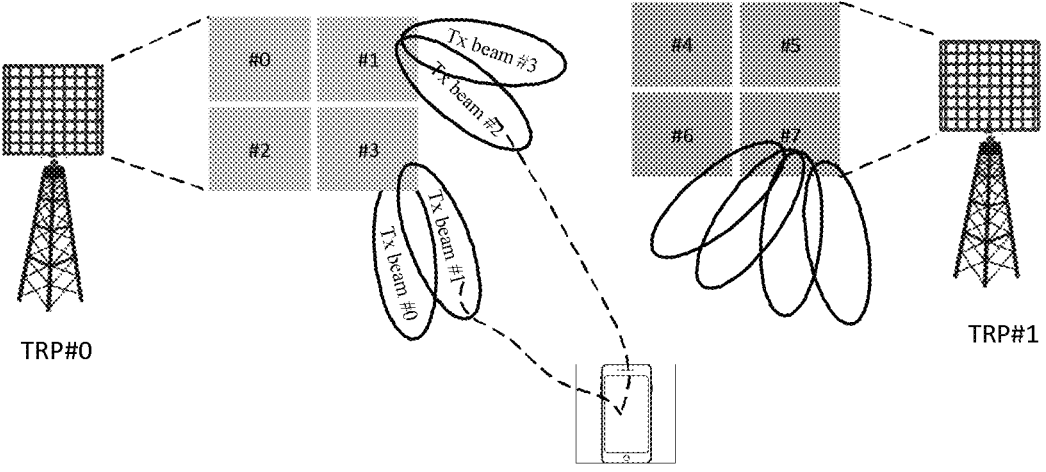
FIG. 2 is a schematic diagram showing an example in which two downlink emitting beams reported by UE come from different antenna panels of the same TRP.

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

FIG. 3 is a block diagram showing functional blocks of an electronic apparatus 100 for wireless communications according to an embodiment of the present disclosure. As shown in FIG. 3, the electronic apparatus 100 includes a transmitting unit 101 and a receiving unit 102. The transmitting unit 101 is configured to transmit downlink reference signal resource configuration information to UE to be used for downlink beam scanning, and the downlink reference signal resource configuration information includes information of a TRP emitting a downlink emitting beam. The receiving unit 102 is configured to receive group-based beam quality report from the UE, and the group-based beam quality report is used for a network side to determine for the UE a group of downlink emitting beams that may be emitted simultaneously and received by the UE simultaneously.

The transmitting unit 101 and the receiving unit 102 may be implemented by one or more processing circuitries. The processing circuitry may be implemented as, for example, a chip or a processor. Moreover, it should be understood that various functional units in the electronic apparatus shown in FIG. 3 are only logical modules divided based on their specific functions, and are not intended to limit a specific implementation. The same applies to the examples of other electronic apparatuses to be described later.

The electronic apparatus 100 may be arranged on a base station side or may be communicatively connected to the base station, for example. The base station described in the present disclosure may also be gNB, eNB, TRP, Access Point (AP), etc. Here, it should be noted that the electronic apparatus 100 may be implemented in a chip level or in an apparatus level. For example, the electronic apparatus 100 may serve as the base station itself, and may further include an external device such as a memory and a transceiver (not shown). The memory may be configured to store programs required to be executed by the base station to implement various functions, and related data information. The transceiver may include one or more communication interfaces to support communication with different devices (for example, UE, another base station, or the like). The specific implementation of the transceiver is not specifically limited herein.

Hereinafter, a downlink reference signal may be CSI-RS or SSB. Through beam forming, each downlink reference signal corresponds to a downlink emitting beam direction. For example, in the 5G standard of 3GPP, it is proposed to use a Transmission Configuration Indicator (TCI) state to indicate a downlink emitting beam. Each TCI state corresponds to a downlink reference signal, that is, corresponds to a direction of a downlink emitting beam.

The downlink reference signal resource configuration information is used to configure time-frequency resources of a downlink reference signal to be measured by the UE. Since different downlink reference signals correspond to different downlink emitting beam directions, it is equivalent to performing downlink beam scanning on the UE. The UE sequentially measures the quality of the downlink emitting beams, selects a beam with good quality based on, for example, the L1-RSRP or L1-SINR criteria and reports it to the network side. For example, the UE may report an identifier (ID) of the selected beam, such as CSI-RS Resource Indicator (CRI) or SSB Resource Indicator (SSBRI).

In this embodiment, the downlink reference signal resource configuration information includes information of a TRP emitting a downlink emitting beam, that is, the UE can acquire knowledge of the TRP which the measured downlink emitting beam comes from. In this way, the UE may be prevented from selecting beams of the same TRP for reporting.

According to the current 3GPP protocol, UE may be configured with at most two TRPs, and each TRP may be configured with multiple downlink control channel resources (CORESET). In addition, a parameter CORESET-PoolIndex is set in the CORESET to distinguish different TRPs. For example, the CORESETPoolIndex of the CORESET where a Physical Downlink Control Channel (PDCCH) is located transmitted by a TRP #0 is configured as 0, while a CORESETPoolIndex of the CORESET where a PDCCH is located transmitted by the TRP #1 is located is configured as 1.

Therefore, CORESETPoolIndex of a TRP may be used as information of the TRP, that is, downlink reference signal resources of the same TRP may be associated with the same CORESETPoolIndex.

The downlink reference signal resource configuration information in this embodiment may be transmitted to the UE through radio resource control (RRC) signaling. As an example, FIG. 4 shows a schematic diagram of pseudo codes for configuring CSI-RS resources through the RRC signaling. On the basis of the existing codes, a controlResource-SetId in the last line is added, and the value of the controlResourceSetId is CORESETPoolIndex corresponding to a TRP, and thus the controlResourceSetId indicates the information of the TRP corresponding to the CSI-RS resources.

It should be understood that FIG. 4 shows only an example of RRC configuration, and is not restrictive. There may also be other configurations, as long as a set of downlink reference signal resources of a TRP is associated with the TRP. For example, a set of downlink reference signal resources of a TRP may be put in a list and is configured with CORESETPoolIndex of the TRP, and a set of downlink reference signal resources of another TRP is put in another list and is configured with CORESETPoolIndex of the other TRP.

In addition, it is also possible to make different antenna panels of the TRP correspond to different resource sets of downlink reference signal resources respectively, so that the UE can determine an antenna panel emitting a downlink emitting beam corresponding to each of the downlink reference signal resources. FIG. 5 shows an example in which different antenna panels correspond to different sets of downlink reference signal resources. Four antenna panels of TRP #0 are respectively associated with reference signal resource sets RS Resource Set #0 to RS Resource Set #3, and these resource sets have the same TRP ID, that is, the CORESETPoolIndex of the TRP #0. Similarly, four antenna panels of TRP #1 are respectively associated with reference signal resource sets RS Resource Set #4 to RS Resource Set #7, and these resource sets have the same TRP ID, that is, the CORESETPoolIndex of the TRP #1.

With the above settings, the UE can know which antenna panel of which TRP the measured downlink emitting beam comes from. In this way, the UE may avoid selecting beams from the same panel of the same TRP for reporting.

As mentioned above, the UE needs to report a measurement result to the network side after the measurement is completed, so that the network side indicates a downlink emitting beam to be used for the UE based on the measurement result. In this embodiment, the UE performs group-based beam quality reporting to enable the network side to determine a group of downlink emitting beams for the UE based on the beam quality report. The group of downlink emitting beams can be emitted by the network side simultaneously and may be received by the UE simultaneously.

In a first example, the group-based beam quality report at least includes identifiers of downlink emitting beams in a beam group and an identifier of a receiving beam set used by the UE for receiving the beam group. Receiving beams in the receiving beam set may be emitted by the UE simultaneously. Also, as mentioned above, the UE may perform selection based on the CORESETPoolIndex in the downlink reference signal resource configuration information, so that each downlink emitting beam in the beam group comes from different TRPs or comes from different antenna panels of the same TRP, to ensure that beams in the beam group may be emitted simultaneously.

Figure 6:
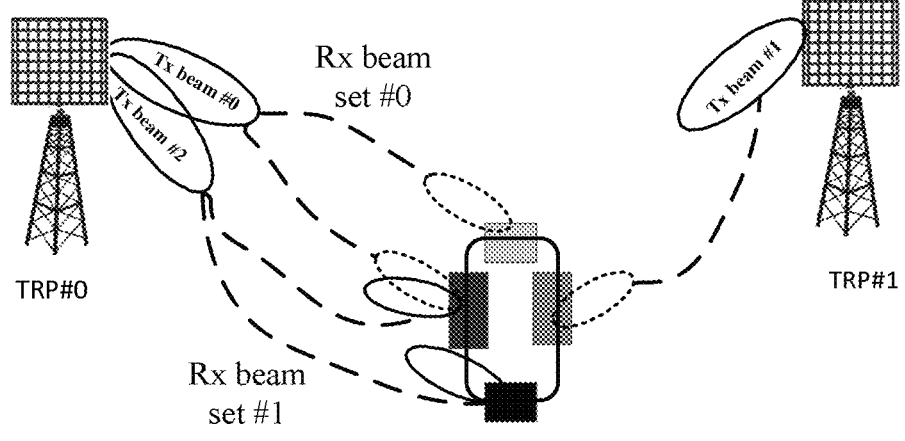
FIG. 6 shows a schematic diagram of an example of group-based beam quality report.

For ease of understanding, FIG. 6 shows a schematic diagram of group-based beam quality report in this example. The UE forms two receiving beam sets Rx beam Set #0 (the receiving beam is represented by a dashed line) and Rx beam Set #1 (the receiving beam is represented by a solid line). Rx beam Set #0 can receive Tx beam #0 and Tx beam #1, and Rx beam Set #1 can receive Tx beam #2. It may be seen that receiving beams in the same receiving beam set are located on different antenna panels, so they may be emitted simultaneously. For example, the UE may report one or more beam groups. Specifically, the UE may report Tx beam #0 and Tx beam #1 belonging to different TRPs and a receiving beam set Rx beam Set #0 that can receive these two beams. In addition, the UE may also report the beam quality of Tx beam #0 and Tx beam #1. In this way, in a case that the beam quality of Tx beam #0 and Tx beam #1 meets requirements, the network side may directly allocate this group of downlink emitting beams to the UE.

The specific report form of the UE is not restrictive, as long as it contains the above information. For example, a form of the downlink emitting beam being in correspondence with the receiving beam set may be used to report. Taking FIG. 6 as an example, the report may be performed as follows: Tx beam #0↔Rx beam Set #0; Tx beam #1↔Rx beam Set #0; Tx beam #2↔Rx beam Set #1.

In addition, the transmitting unit 101 may further be configured to transmit a group beam indicator to the UE. The group beam indicator includes an identifier of a receiving beam set corresponding to a group of downlink emitting beams determined by the network side for the UE. In the example of FIG. 6, for example, the group beam indicator may be Rx beam Set #0.

It should be understood that the form of a group beam indicator is not limited thereto. For example, a TCI state ID may further be associated with the identifier of the receiving beam set, that is, the TCI state ID has a predetermined correspondence with the identifier of the receiving beam set. The predetermined correspondence may be notified to the UE in advance through RRC signaling, for example, or agreed between the network side and the UE in advance. In this case, the group beam indicator may include the TCI state ID. This method may minimize the impact on existing protocols and save the overhead as much as possible.

Figure 7:
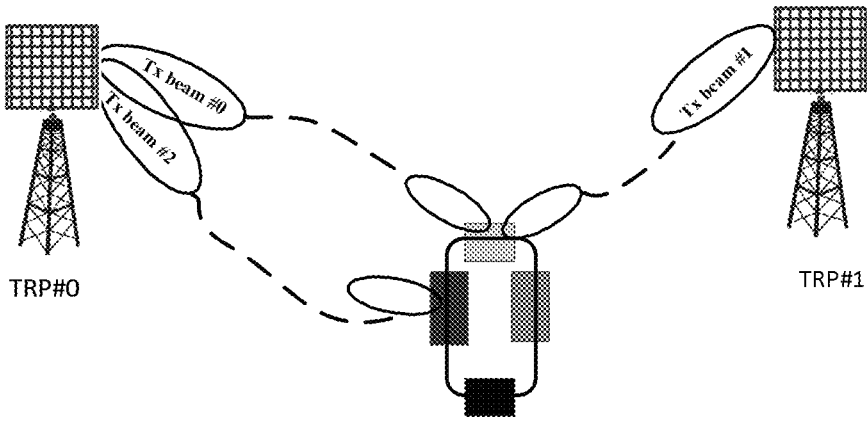
FIG. 7 shows a schematic diagram of another example of group-based beam quality report.

In a second example, group-based beam quality report at least includes an identifier of an antenna panel of the UE and an identifier of a downlink emitting beam received by the antenna panel. That is, the report by the UE is performed in accordance with the antenna panel. FIG. 7 shows a schematic diagram of the group-based beam quality report in this example. An antenna panel #0 of the UE receives the downlink emitting beam Tx beam #0 and Tx beam #1, and an antenna panel #1 of the UE receives the downlink emitting beam Tx beam #2, beam quality report may have the following forms or other equivalent forms: Tx beam #0↔antenna panel #0; Tx beam #1↔antenna panel #0; Tx beam #2↔antenna panel #1.

As mentioned above, the UE can know information of a TRP or an antenna panel corresponding to each downlink emitting beam. In order to enable simultaneous transmission of multiple beams, the UE should try to use different antenna panels to receive downlink emitting beams from different TRPs or from different antenna panels of the same TRP as much as possible.

Figures 8, 9, 10:
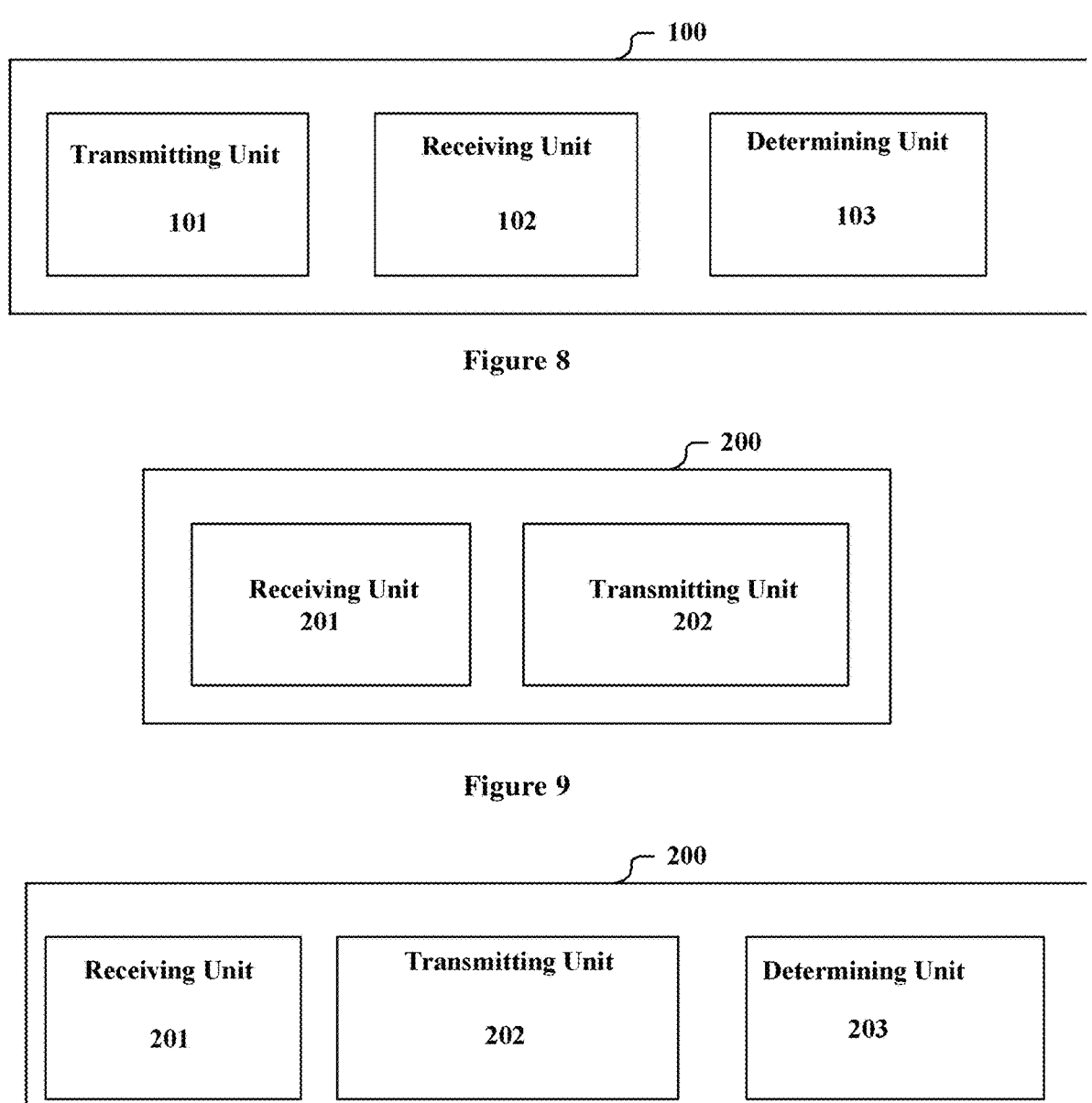
FIG. 8 is a block diagram showing functional modules of an electronic apparatus for wireless communications according to an embodiment of the present disclosure.
FIG. 9 is a block diagram showing functional modules of an electronic apparatus for wireless communications according to another embodiment of the present disclosure.
FIG. 10 is a block diagram showing functional modules of an electronic apparatus for wireless communications according to another embodiment of the present disclosure.

As shown in FIG. 8, in this example, the electronic apparatus 100 may further include a determining unit 103. The determining unit 103 is configured to determine a group of downlink emitting beams for the UE based on the group-based beam quality report from the UE, so that respective ones of the group of downlink emitting beams is emitted by different TRPs or by different antenna panels of the same TRP, and is received by different antenna panels of the UE. For example, in the example in FIG. 7, Tx beam #1 and Tx beam #2 may be allocated to the UE.

For example, an identifier of an antenna panel may be represented by a sounding reference signal resource set ID, SRS resource set ID. The SRS resource set exactly corresponds to beams used by an antenna panel when performing uplink beam scanning, and thus may be used to represent the corresponding antenna panel.

In addition, the transmitting unit 101 is further configured to transmit a group beam indicator to the UE, and the group beam indicator may include the identifier of each downlink emitting beam and an identifier of an antenna panel used by the UE for receiving the downlink emitting beam. Taking FIG. 9 as an example, the group beam indicator may include: Tx beam #1, antenna panel #0; Tx beam #2, antenna panel #1.

In a case that each antenna panel of the UE reports different downlink emitting beams, the group beam indicator may not include the identifier of the antenna panel. On the other hand, in a case that two or more antenna panels report the same downlink emitting beam, the downlink emitting beam may be associated with the two or more antenna panels in the group beam indicator, that is, the UE is instructed to use two or more antenna panels for reception.

Different UE may have different beam quality reporting capabilities. For example, some UE support group-based beam quality report, while others do not support group-based beam quality report. Accordingly, the receiving unit 102 may further be configured to acquire information about beam quality reporting capability of the UE from the UE, and the determining unit 103 configures a beam quality reporting manner of the UE based on the information. For example, the transmitting unit 101 may notify the UE of the beam quality reporting manner through RRC signaling.

For example, the beam quality reporting capability of the UE includes one of the following: not supporting group-based beam quality reporting; supporting group-based beam quality reporting manner I; supporting group-based beam quality reporting manner II; and supporting both the group-based beam quality reporting manner I and the group-based beam quality reporting manner II. In the group-based beam quality reporting manner I (that is, the method described in the first example), the group-based beam quality report at least includes identifiers of downlink emitting beams in a beam group and an identifier of a receiving beam set used by the UE for receiving the beam group. In the group-based beam quality reporting manner II (that is, the method described in the second example), the group-based beam quality report at least includes an identifier of an antenna panel of the UE and an identifier of a downlink emitting beam received by the antenna panel.

For example, the determining unit 103 may determine a beam quality reporting manner for the UE based on its beam quality reporting capability. For example, when the UE can support both manner I and manner II, the determining unit 103 may arbitrarily determine one of the two manners as the beam quality reporting manner to be used by the UE.

In addition, when the UE can support the group-based beam quality report, the receiving unit 102 may further be configured to acquire more detailed parameters about its beam quality reporting capability from the UE. For example, the receiving unit 102 may also acquire information about the maximum number of beam groups and the maximum number of beams in each group that the UE can report from the UE. Taking manner I as an example, the receiving unit 102 may acquire {Alt.1, N=4, K=2} from the UE, and {Alt.1, N=4, K=2} indicates that the UE supports the beam quality reporting manner I, can report at most 4 groups of beam groups, and each beam group includes at most 2 different downlink emitting beams.

To sum up, the electronic apparatus 100 according to this embodiment enables both the network side and the UE to know information of a TRP emitting a downlink emitting beam by modifying the downlink reference signal resource configuration information, and improves group-based beam quality report of the UE, so as to ensure that the network side can determine, for the UE, a group of downlink emitting beams that can be emitted simultaneously and can be received by the UE simultaneously, that is, to ensure the simultaneous transmission of multiple beams.

Second Embodiment

FIG. 9 is a block diagram showing functional modules of the electronic apparatus 200 for wireless communications according to an embodiment of the present disclosure. As shown in FIG. 9, the electronic apparatus 200 includes a receiving unit 201 and a transmitting unit 202. The receiving unit 201 is configured to receive downlink reference signal resource configuration information from a network side to be used for downlink beam scanning, and the downlink reference signal resource configuration information includes information of a TRP emitting a downlink emitting beam. The transmitting unit 202 is configured to transmit group-based beam quality report to the network side, and the group-based beam quality report is used by a network side to determine, for the UE, a group of downlink emitting beams that can be transmitted simultaneously and received by the UE simultaneously.

The receiving unit 201 and the transmitting unit 202 may be implemented by one or more processing circuitries, and the processing circuitry may be implemented as chips and processors, for example. Furthermore, it should be understood that various functional units in the electronic apparatus shown in FIG. 9 are only logical modules divided based on their specific functions, and are not intended to limit a specific implementation.

The electronic apparatus 200 may be arranged on a UE side or may be communicatively connected to the UE, for example. Here, it should be noted that the electronic apparatus 200 may be implemented in a chip level or in an apparatus level. For example, the electronic apparatus 200 may function as the UE itself, and may further include an external device such as a memory and a transceiver (not shown in the figure). The memory may be configured to store programs required to be executed by the UE to implement various functions, and related data information. The transceiver may include one or more communication interfaces to support communication with different apparatuses (for example, a base station, other user equipment or the like). An implementation of the transceiver is not specifically limited herein.

Hereinafter, the same or corresponding contents as those in the first embodiment will not be described repeatedly, and one can refer to those in the first embodiment.

Similarly, the downlink reference signal may be CSI-RS or SSB. Through beam forming, a downlink reference signal corresponds to a downlink emitting beam direction. The downlink reference signal resource configuration information is used to configure time-frequency resources of a downlink reference signal to be measured by the UE. Since different downlink reference signals correspond to different downlink emitting beam directions, it is equivalent to performing downlink beam scanning on the UE. The UE sequentially measures the quality of downlink emitting beams, selects a beam with good quality based on, for example, the L1-RSRP or L1-SINR criteria and reports it to the network side. For example, the UE may report the identifier (ID) of the selected beam, such as CRI or SSBRI.

In this embodiment, the downlink reference signal resource configuration information includes information of a TRP emitting a downlink emitting beam. The receiving unit 201 may receive the downlink reference signal resource configuration information through RRC signaling. The information of the TRP may include, for example, CORE-SETPoolIndex of the TRP. That is, downlink reference signal resources of the same TRP are associated with the same CORESETPoolIndex. The specific details have been described in the first embodiment, which are also applicable to this embodiment, and are not repeated here.

The UE can know which TRP the measured downlink emitting beam comes from by parsing the downlink reference signal resource configuration information. In this way, the UE may avoid selecting beams from the same TRP for reporting as much as possible.

In addition, it is also possible to make different antenna panels of a TRP correspond to different resource sets of downlink reference signal resources, so that the UE can determine an antenna panel emitting a downlink emitting beam corresponding to each of the downlink reference signal resources, so as to avoid selecting beams from the same panel of the same TRP for reporting. The specific description of this correspondence has been given in the first embodiment with reference to FIG. 5, and is not repeated here.

Accordingly, as shown in FIG. 10, the electronic apparatus 200 may further include a determining unit 203.

In the first example, the determining unit 203 is configured to determine the reported beam groups, so that each downlink emitting beam in each beam group is emitted by different TRPs or emitted by different antenna panels of the same TRP and received by different antenna panels of the UE.

For example, the group-based beam quality report transmitted by the transmitting unit 202 at least includes identifiers of downlink emitting beams in a beam group and an identifier of the receiving beam set used by the UE for receiving the beam group. Receiving beams in the receiving beam set may be emitted by the UE simultaneously. Also, as mentioned above, the determining unit 203 may perform selection based on the CORESETPoolIndex in the downlink reference signal resource configuration information, so that respective downlink emitting beams in the beam group come from different TRPs or come from different antenna panels of the same TRP, to ensure that respective beams in the beam group may be emitted by the network side simultaneously.

In addition, the receiving unit 201 is further configured to receive a group beam indicator from the network side. The group beam indicator includes an identifier of a receiving beam set corresponding to a group of downlink emitting beams determined by the network side for the UE. The form of group beam indicator is not limited to this. For example, a TCI state ID may be associated with the identifier of the receiving beam set, that is, the TCI state ID has a predetermined correspondence with the identifier of the receiving beam set. The predetermined correspondence may be obtained from the network side in advance through RRC signaling, for example, or agreed between the network side and the UE in advance. In this case, the group beam indicator may include the TCI status ID. This method may minimize the impact on existing protocols and save the overhead as much as possible.

In a second example, the group-based beam quality report at least includes the identifier of an antenna panel of the UE and an identifier of a downlink emitting beam received by the antenna panel. That is, the report by the UE is performed in accordance with the antenna panel. As mentioned above, the UE can know information of a TRP or an antenna panel corresponding to each downlink emitting beam. In order to enable simultaneous transmission of multiple beams, the determining unit 203 is configured to determine the group-based beam quality report, so that different antenna panels receive downlink emitting beams from different TRPs or downlink emitting beams from different antenna panels of the same TRP.

The receiving unit 201 is further configured to receive a group beam indicator from the network side. The group beam indicator includes, for example, an identifier of each of the group of downlink emitting beams determined by the network side for the UE and an identifier of an antenna panel used by the UE for receiving the downlink emitting beam. In a case that respective antenna panels of the UE reports different downlink emitting beams, the group beam indicator may not include the identifier of the antenna panel. On the other hand, in a case that two or more antenna panels report the same downlink emitting beam, the downlink emitting beam may be associated with the two or more antenna panels in the group beam indicator, that is, the UE uses two or more antenna panels for reception.

For example, an identifier of an antenna panel may be represented by an SRS Resource set ID. The SRS Resource Set exactly corresponds to a beam used by an antenna panel when performing uplink beam scanning, and thus may be used to represent the corresponding antenna panel.

More specific description and illustrative examples of the above two examples have been described in the first embodiment, and are not repeated here.

Different UE may have different beam quality reporting capabilities. For example, some UE support group-based beam quality report, while others do not support group-based beam quality report. Accordingly, the transmitting unit 202 may further be configured to transmit information about beam quality reporting capability of the UE to the network side, and the receiving unit 201 acquires a beam quality reporting manner configured for the UE from the network side. For example, the receiving unit 201 may acquire information of the beam quality reporting manner through RRC signaling.

For example, the beam quality reporting capability of the UE includes one of the following: not supporting group-based beam quality reporting; supporting group-based beam quality reporting manner I; supporting group-based beam quality reporting manner II; and supporting both the group-based beam quality reporting manner I and the group-based beam quality reporting manner II. In the group-based beam quality reporting manner I (that is, the method described in the first example), group-based beam quality report at least includes identifiers of downlink emitting beams in a beam group and an identifier of a receiving beam set used by UE for receiving the beam group. In the group-based beam quality reporting manner II (that is, the method described in the second example), group-based beam quality report at least includes an identifier of an antenna panel of the UE and an identifier of a downlink emitting beam received by the antenna panel.

In addition, when the UE can support group-based beam quality report, the transmitting unit 202 may transmit more detailed parameters about beam quality reporting capability of the UE to the network side. For example, the transmitting unit 202 may transmit information about the maximum number of beam groups and the maximum number of beams in each group that the UE can report to the network side.

To sum up, the electronic apparatus 200 according to this embodiment enables both the network side and the UE to know information of a TRP emitting a downlink emitting beam by modifying the downlink reference signal resource configuration information, and improves group-based beam quality report of the UE, so as to ensure that the network side can determine, for the UE, a group of downlink emitting beams that can be emitted simultaneously and can be received by the UE simultaneously, that is, to ensure simultaneous transmission of multiple beams.

Figure 11:
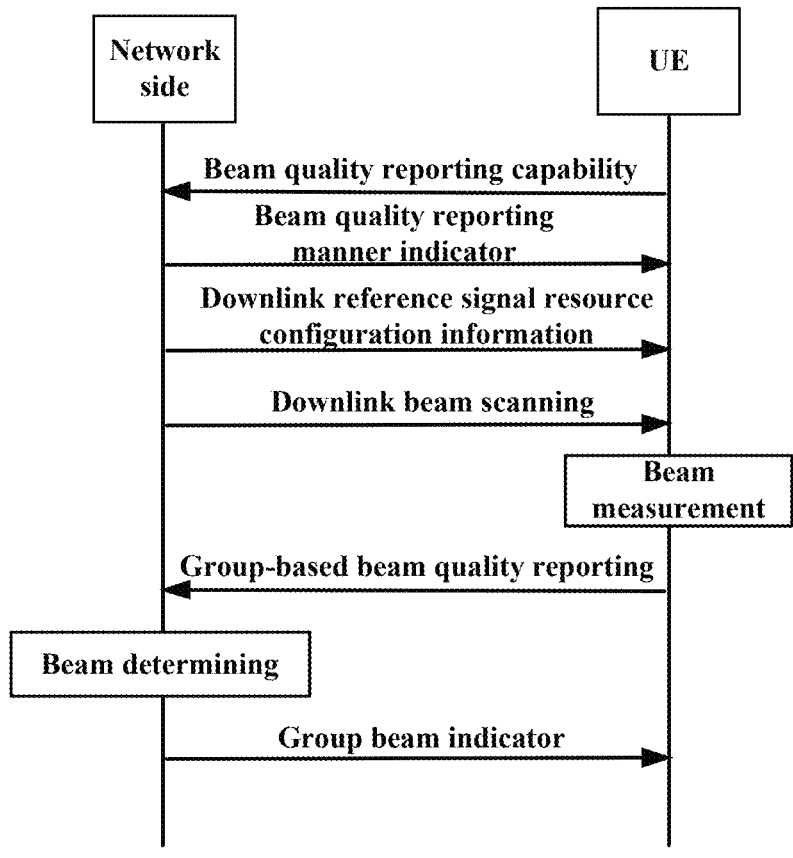
FIG. 11 shows a schematic diagram of the information procedure between the network side and the UE.

For ease of understanding, FIG. 11 shows a schematic diagram of an information procedure between the network side and the UE. It should be noted that the flowchart is only schematic, but not restrictive.

The UE reports its beam quality reporting capability to the network side. In the example of FIG. 1, it is assumed that the UE supports group-based beam quality report, for example, supports both manner I and manner II as mentioned above. The network side determines that the UE should use manner I for beam quality report based on information of the capability, and indicates this manner to the UE. The network side also transmits downlink reference signal resource configuration information to the UE through RRC signaling, and the downlink reference signal resource configuration information includes information of a TRP for transmitting each downlink emitting beam. The network side performs downlink beam scanning based on the downlink reference signal resource configuration information, and the UE performs beam measurement accordingly and performs group-based beam quality report using the manner I, for example, reporting identifiers of downlink emitting beams in a beam group and an identifier of a receiving beam set used by the UE for receiving the beam group. The network side determines a beam to be applied to the UE based on the reported beam quality measurement result, and transmits a group beam indicator to the UE, such as the identifier of the receiving beam set or the corresponding TCI state ID described above.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figures 12, 13:
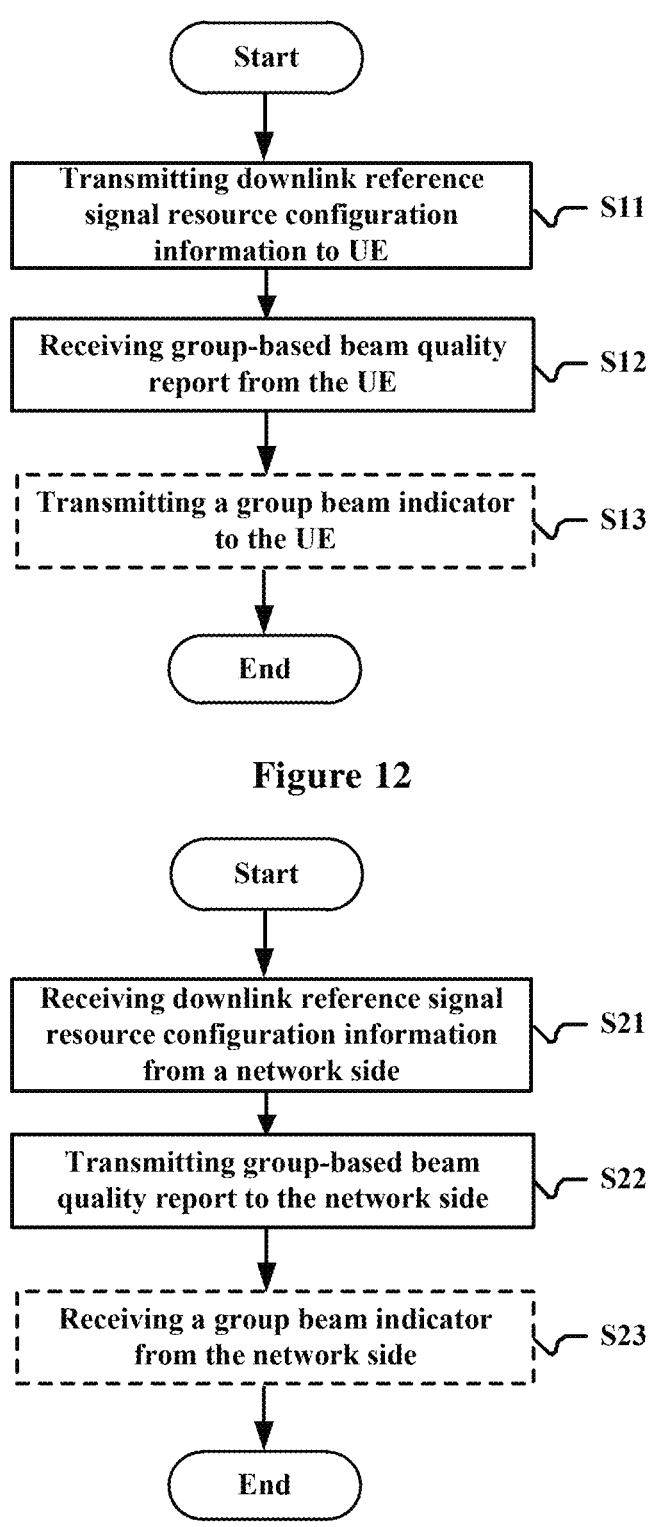
FIG. 12 shows a flow chart of a method for wireless communications according to an embodiment of the present disclosure.
FIG. 13 shows a flow chart of a method for wireless communications according to an embodiment of the present disclosure.

FIG. 12 shows a flow chart of a method for wireless communications according to an embodiment of the present disclosure. The method includes: transmitting downlink reference signal resource configuration information to UE to be used for downlink beam scanning (S11), the downlink reference signal resource configuration information including information of a TRP emitting a downlink emitting beam; and receiving group-based beam quality report from the UE (S12), the group-based beam quality report being used by a network side to determine, for the UE, a group of downlink emitting beams which can be emitted simultaneously and can be received by the UE simultaneously. The method is performed on the network side, for example.

For example, the information of the TRP includes CORE-SETPoolIndex of the TRP. In addition, different antenna panels of the TRP may correspond to different resource sets of downlink reference signal resources respectively, so that the UE can determine an antenna panel emitting a downlink emitting beam corresponding to each of the downlink reference signal resources.

As shown in the dashed line block in the figure, the above method may further include a step S13: transmitting a group beam indicator to the UE.

In one example, the group-based beam quality report at least includes identifiers of downlink emitting beams in a beam group and an identifier of a receiving beam set used by the UE for receiving the beam group. The group beam indicator includes, for example, the identifier of the receiving beam set corresponding to the group of downlink emitting beams determined by the network side for the UE. Alternatively, the group beam indicator may include a TCI state ID, and the TCI state ID has a predetermined correspondence with the identifier of the receiving beam set.

In another example, the group-based beam quality report at least includes an identifier of an antenna panel of the UE and an identifier of the downlink emitting beam received by the antenna panel. The above method further includes: determining the group of downlink emitting beams based on the group-based beam quality report, so that respective ones of the group of downlink emitting beams are transmitted by different TRPs or by different antenna panels of the same TRP and received by different antenna panels of the UE.

For example, an identifier of an antenna panel may be represented by an identifier of an SRS resource set.

The group beam indicator transmitted in step S13 may include an identifier of each downlink emitting beam and an identifier of an antenna panel used by the UE for receiving the downlink emitting beam.

In addition, the above method further includes: acquiring information about beam quality reporting capability of the UE from the UE, and configuring a beam quality reporting manner of the UE based on the information.

For example, the beam quality reporting capability of the UE includes one of the following: not supporting group-based beam quality reporting; supporting group-based beam quality reporting manner I; supporting group-based beam quality reporting manner II; and supporting both the group-based beam quality reporting manner I and the group-based beam quality reporting manner II. In the group-based beam quality reporting manner I, the group-based beam quality report at least includes identifiers of downlink emitting beams in a beam group and an identifier of a receiving beam set used by UE for receiving the beam group. In the group-based beam quality reporting manner II, the group-based beam quality report at least includes an identifier of an antenna panel of the UE and an identifier of a downlink emitting beam received by the antenna panel.

In addition, information about the maximum number of beam groups and the maximum number of beams in each group that the UE can report may also be acquired from the UE.

FIG. 13 shows a flow chart of a method for wireless communications according to an embodiment of the present disclosure. The method includes: receiving downlink reference signal resource configuration information from a network side to be used for downlink beam scanning (S21), the downlink reference signal resource configuration information including information of a Transmit Receive Point emitting a downlink emitting beam; and transmitting group-based beam quality report to the network side (S22), the group-based beam quality report being used by the network side to determine, for the UE, a group of downlink emitting beams which can be emitted simultaneously and can be received by the UE simultaneously. The method is performed on the UE side, for example.

For example, the information of the TRP includes CORE-SETPoolIndex of the TRP. In addition, different antenna panels of the TRP may correspond to different resource sets of downlink reference signal resources respectively. The above method further includes: determining the reported beam group, so that downlink emitting beams in each beam group are emitted by different antenna panels of the TRP and received by different antenna panels of the UE.

The above method may further include: determining the reported beam group, so that downlink emitting beams in each beam group are emitted by different TRPs and received by different antenna panels of the user equipment.

As shown in the dashed line block in FIG. 13, the above method may further include S13: receiving a group beam indicator from the network side.

In one example, the group-based beam quality report at least includes identifiers of downlink emitting beams in a beam group and an identifier of a receiving beam set used by the UE for receiving the beam group. The group beam indicator includes, for example, an identifier of a receiving beam set corresponding to the group of downlink emitting beams determined by the network side for the UE. Alternatively, the group beam indicator includes a TCI state ID. The TCI state ID has a predetermined correspondence with the identifier of the receiving beam set.

In another example, the group-based beam quality report at least includes an identifier of an antenna panel of the UE and an identifier of a downlink emitting beam received by the antenna panel. The above method may further include: determining the group-based beam quality report, so that different antenna panels receive downlink emitting beams from different TRPs or receive downlink emitting beams from different antenna panels of the same TRP.

For example, the identifier of the antenna panel may be represented by an identifier of an SRS resource set.

The above method may further include: transmitting information about beam quality reporting capability of UE to a network side, and acquiring a beam quality reporting manner configured for the UE from the network side.

For example, the beam quality reporting capability of the UE includes one of the following: not supporting group-based beam quality reporting; supporting group-based beam quality reporting manner I; supporting group-based beam quality reporting manner II; and supporting both the group-based beam quality reporting manner I and the group-based beam quality reporting manner II. In the group-based beam quality report manner I, the group-based beam quality report at least includes identifiers of downlink emitting beams in a beam group and an identifier of a receiving beam set used by UE for receiving the beam group. In the group-based beam quality reporting manner II, the group-based beam quality report at least includes an identifier of an antenna panel of the UE and an identifier of a downlink emitting beam received by the antenna panel.

In addition, information about the maximum number of beam groups and the maximum number of beams in each group that the UE can report may also be transmitted to the network side.

Note that the above methods may be used in combination with each other or individually, which have been described in detail in the first to second embodiments and are not be repeated herein.

The technology of the present disclosure may be applied to various products.

For example, the electronic apparatus 100 may be implemented as various types of base stations. The base stations may be implemented as any type of evolved node B (eNB) or gNB (5G base station). The eNB includes a macro eNB and a small eNB, for example. The small eNB may be an eNB such as a pico eNB, a micro eNB and a home (femto) eNB that covers a cell smaller than a macro cell. The situation is similar to the gNB. Alternatively, the base station may also be implemented as a base station of any other type, such as a NodeB and a base transceiver station (BTS). The base station may include a main body (that is also referred to as a base station device) configured to control wireless communications, and one or more remote radio heads (RRH) arranged in a different place from the main body. In addition, various types of user equipment each may operate as the base station by performing functions of the base station temporarily or semi-permanently.

The electronic apparatus 200 may be implemented as various types of user equipment. The user equipment may be implemented as a mobile terminal (such as a smartphone, a tablet personal computer (PC), a notebook PC, a portable game terminal, a portable/dongle type mobile router, and a digital camera), or an in-vehicle terminal (such as a car navigation device). The user equipment may also be implemented as a terminal (that is also referred to as a machine type communication (MTC) terminal) that performs machine-to-machine (M2M) communication. Furthermore, the user equipment may be a wireless communication module (such as an integrated circuit module including a single die) mounted on each of the terminals.

16

Application Examples Regarding a Base Station

First Application Example

Figure 14:
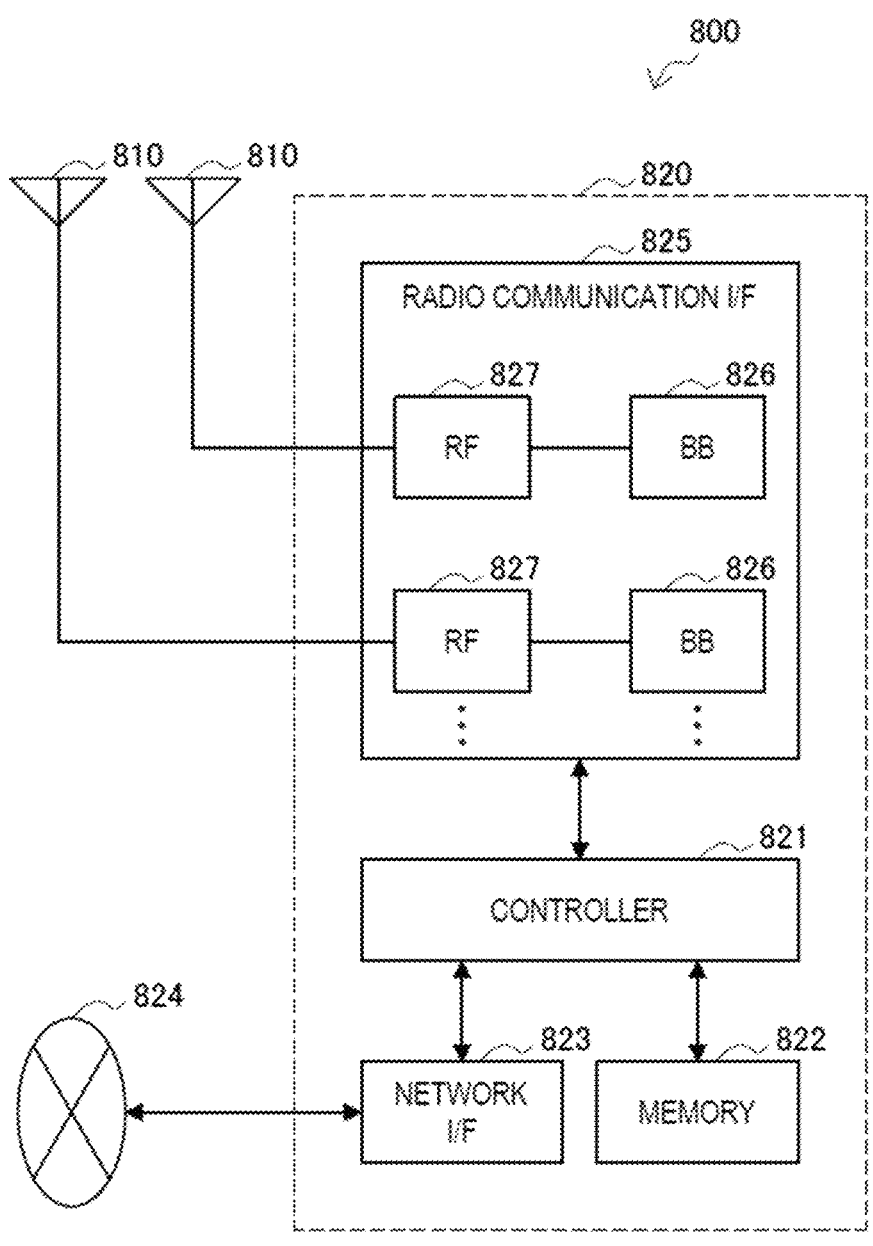
FIG. 14 is a block diagram showing a first example of an exemplary configuration of an eNB or gNB to which the technology of the present disclosure may be applied.

FIG. 14 is a block diagram showing a first example of an exemplary configuration of an eNB or gNB to which the technology according to the present disclosure may be applied.

It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 14, the eNB 800 may include the multiple antennas 810. For example, the multiple antennas 810 may be compatible with multiple frequency bands used by the eNB 800. Although FIG. 14 shows the example in which the eNB 800 includes the multiple antennas 810, the eNB 800 may include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as a terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an SI interface and an X2 interface). The network interface 823 may also be a wired communication interface or a wireless communication interface for wireless backhaul. In a case that the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/ demodulating, and multiplexing/demultiplexing, and perform various types of signal processing of layers (such as L1, Media Access Control (MAC), Radio Link Control (RLC), and a Packet Data Convergence Protocol (PDCP)). The BB processor 826 may have a part or all of the above-described logical functions, to replace the controller 821. The BB processor 826 may be a memory storing communication control programs, or a module including a processor and a related circuit configured to execute the programs. Updating the program may allow the functions of the BB processor 826 to be changed. The module may be a card or a blade inserted into a slot of the base station apparatus 820. Alternatively, the module may be a chip mounted on the card or the blade. Meanwhile, the RF circuit 827 may include, for example, a mixer, a filter, and an amplifier, and transmits and receives wireless signals via the antenna 810.

As shown in FIG. 14, the radio communication interface 825 may include multiple BB processors 826. For example, the multiple BB processors 826 may be compatible with multiple frequency bands used by the eNB 800. The radio communication interface 825 may include multiple RF circuits 827, as shown in FIG. 14. For example, the multiple RF circuits 827 may be compatible with multiple antenna elements. Although FIG. 14 shows the example in which the radio communication interface 825 includes multiple BB processors 826 and multiple RF circuits 827, the radio communication interface 825 may include a single BB processor 826 and a single RF circuit 827.

In the eNB 800 shown in FIG. 14, the transmitting unit 101, the receiving unit 102, and a transceiver of the electronic apparatus 100 may be implemented by the radio communication interface 825. At least a part of the functions may be implemented by the controller 821. For example, the controller 821 may notify the UE of information of a TRP emitting a downlink emitting beam by performing the functions of the transmitting unit 101, the receiving unit 102 and the determining unit 103, thereby realizing group-based beam quality reporting and reliable simultaneous transmission of multiple beams.

Second Application Example

Figure 15:
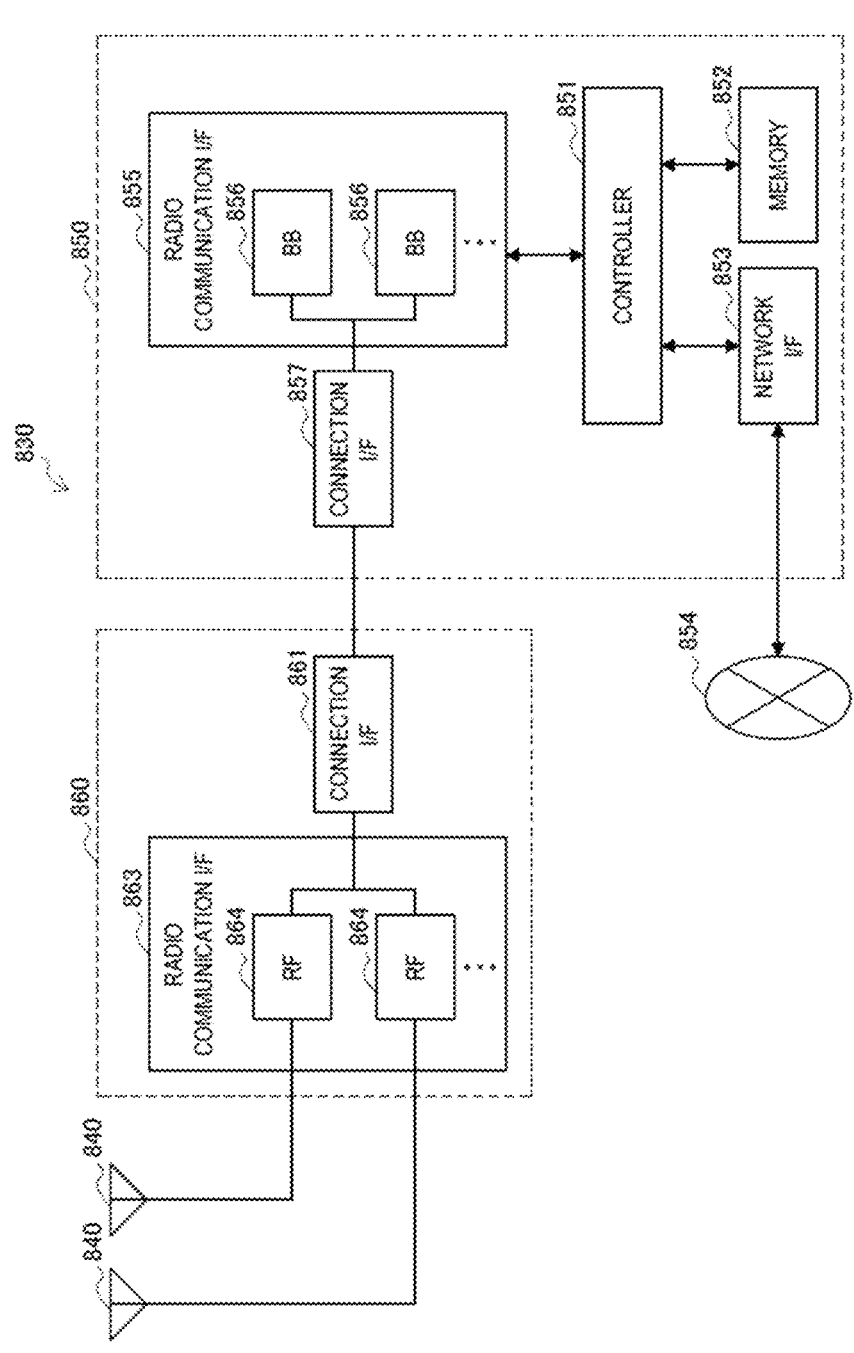
FIG. 15 is a block diagram showing a second example of an exemplary configuration of an eNB or gNB to which the technology of the present disclosure may be applied.

FIG. 15 is a block diagram showing a second example of an exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 15, the eNB 830 may include multiple antennas 840. For example, the multiple antennas 840 may be compatible with multiple frequency bands used by the eNB 830. Although FIG. 15 shows the example in which the eNB 830 includes multiple antennas 840, the eNB 830 may include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 14.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 14, except that the BB processor 856 is connected to an RF circuit 864 of the RRH 860 via the connection interface 857. As show in FIG. 15, the radio communication interface 855 may include multiple BB processors 856. For example, the multiple BB processors 856 may be compatible with multiple frequency bands used by the eNB 830. Although FIG. 15 shows the example in which the radio communication interface 855 includes multiple BB processors 856, the radio communication interface 855 may include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, an RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 15. For example, the multiple RF circuits 864 may support multiple antenna elements. Although FIG. 15 shows the example in which the radio communication interface 863 includes multiple RF circuits 864, the radio communication interface 863 may include a single RF circuit 864.

In the eNB 830 shown in FIG. 15, the transmitting unit 101, the receiving unit 102, and a transceiver of the electronic apparatus 100 may be implemented by the radio communication interface 855 and/or the radio communication interface 863. At least a part of the functions may be implemented by the controller 851. For example, the controller 851 may notify the UE of information of a TRP emitting a downlink emitting beam by performing the functions of the transmitting unit 101, the receiving unit 102 and the determining unit 103, thereby realizing group-based beam quality reporting and reliable simultaneous transmission of multiple beams.

Application Examples Regarding User Equipment

First Application Example

Figure 16:
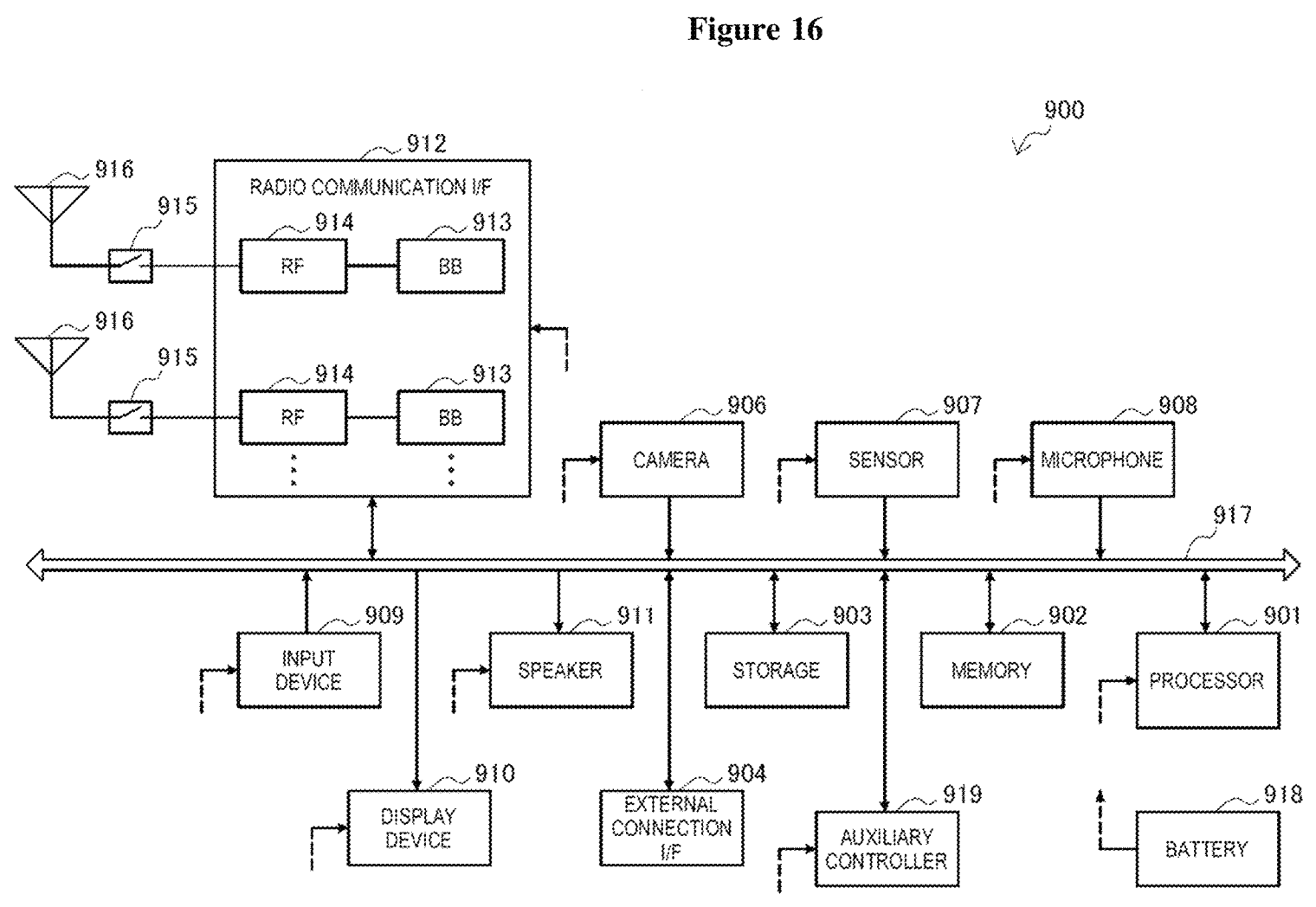

FIG. 16 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919. The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals outputted from the smartphone 900 to sounds.

The radio communication interface 912 supports any cellular communication scheme (such as LTE and LTE-advanced), and performs wireless communications. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 16 shows a case that one RF link is connected to one antenna, which is only illustrative, and a situation where one RF link is connected to multiple antennas through multiple phase shifters is also possible. The radio communication interface 912 may be a chip module having the BB processor 913 and the RF circuit 914 integrated thereon. The radio communication interface 912 may include multiple BB processors 913 and multiple RF circuits 914, as shown in FIG. 16. Although FIG. 16 shows the example in which the radio communication interface 912 includes multiple BB processors 913 and multiple RF circuits 914, the radio communication interface 912 may include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a wireless local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 16. Although FIG. 16 shows the example in which the smartphone 900 includes multiple antennas 916, the smartphone 900 may include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 shown in FIG. 16 via feeder lines, which are partially shown as dashed lines in FIG. 16. The auxiliary controller 919 operates a minimum necessary function of the smartphone 900, for example, in a sleep mode.

In the smartphone 900 shown in FIG. 16, the receiving unit 201, the transmitting unit 202 and a transceiver of the electronic apparatus 200 may be implemented by the radio communication interface 912. At least a part of the functions may be implemented by the processor 901 or the auxiliary controller 919. For example, the processor 901 or the auxiliary controller 919 may obtain information of a TRP emitting a downlink emitting beam by performing the functions of the receiving unit 201, the transmitting unit 202 and the determining unit 203, thereby realizing group-based beam quality reporting and reliable simultaneous transmission of multiple beams.

Second Application Example

Figure 17:
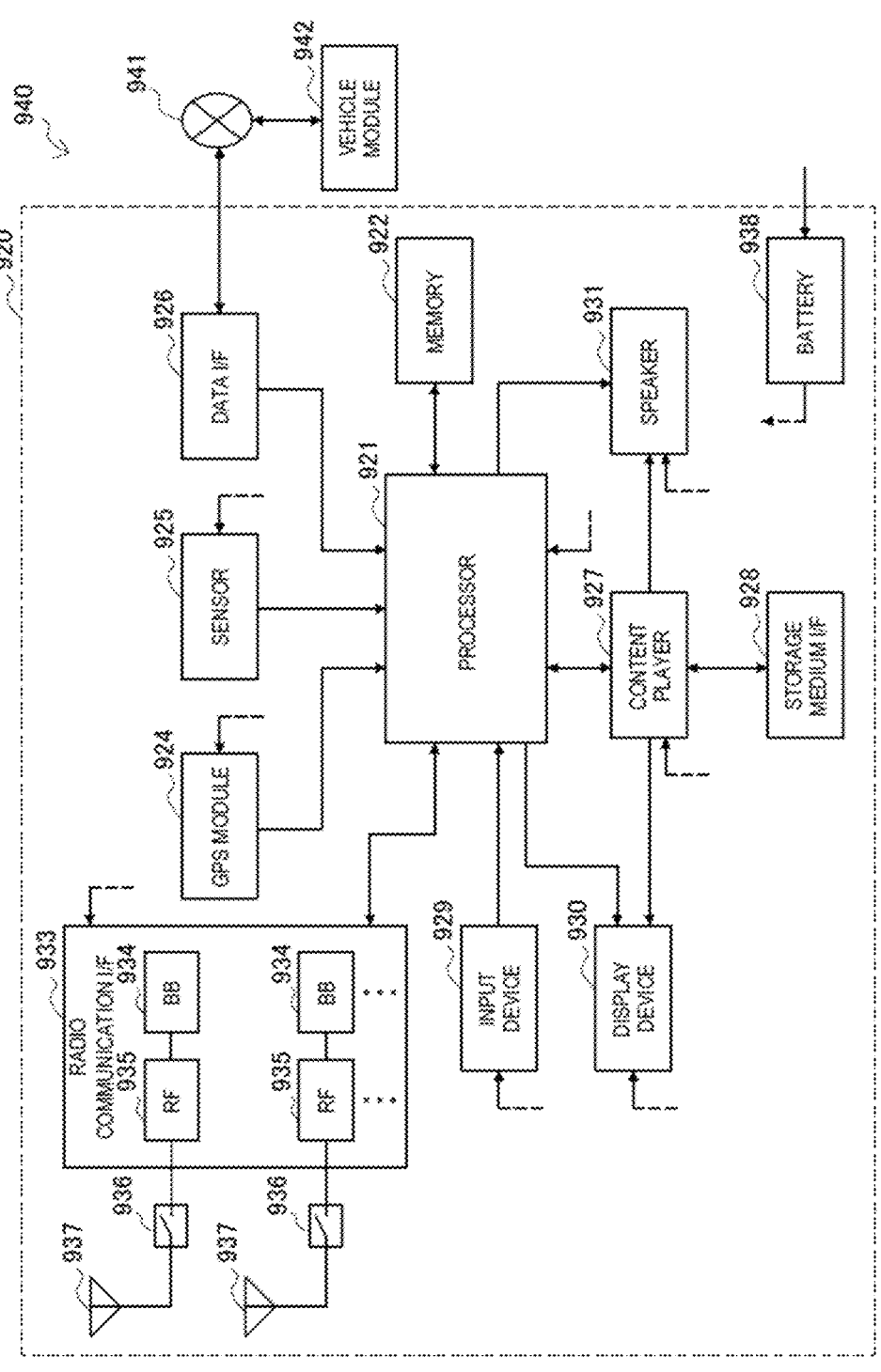
FIG. 17 is a block diagram showing an example of an exemplary configuration of a car navigation apparatus to which the technology according to the present disclosure may be applied.

FIG. 17 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or reproduced content. The speaker 931 outputs a sound for the navigation function or the reproduced content.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 17. Although FIG. 17 shows the example in which the radio communication interface 933 includes multiple BB processors 934 and multiple RF circuits 935, the radio communication interface 933 may include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used for the radio communication interface 933 to transmit and receive wireless signals. As shown in FIG. 17, the car navigation apparatus 920 may include multiple antennas 937. Although FIG. 17 shows the example in which the car navigation apparatus 920 includes multiple antennas 937, the car navigation apparatus 920 may include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 17 via feeder lines that are partially shown as dash lines in FIG. 17. The battery 938 accumulates power supplied from the vehicle.

In the car navigation apparatus 920 shown in FIG. 17, the receiving unit 201, the transmitting unit 202, and a transceiver of the electronic apparatus 200 may be implemented by the radio communication interface 933. At least a part of the functions may be implemented by the processor 921. For example, the processor 921 may obtain information of a TRP emitting a downlink emitting beam by performing the functions of the receiving unit 201, the transmitting unit 202 and the determining unit 203, thereby realizing group-based beam quality reporting and reliable simultaneous transmission of multiple beams.

The technology according to the present disclosure may also be implemented as an in-vehicle system (or a vehicle) 940 including one or more blocks of the car navigation device 920, the in-vehicle network 941, and a vehicle module 942. The vehicle module 942 generates vehicle data (such as vehicle speed, engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1800 shown in FIG. 18) from a storage medium or network, wherein the computer is capable of implementing various functions when installed with various programs.

Figure 18:
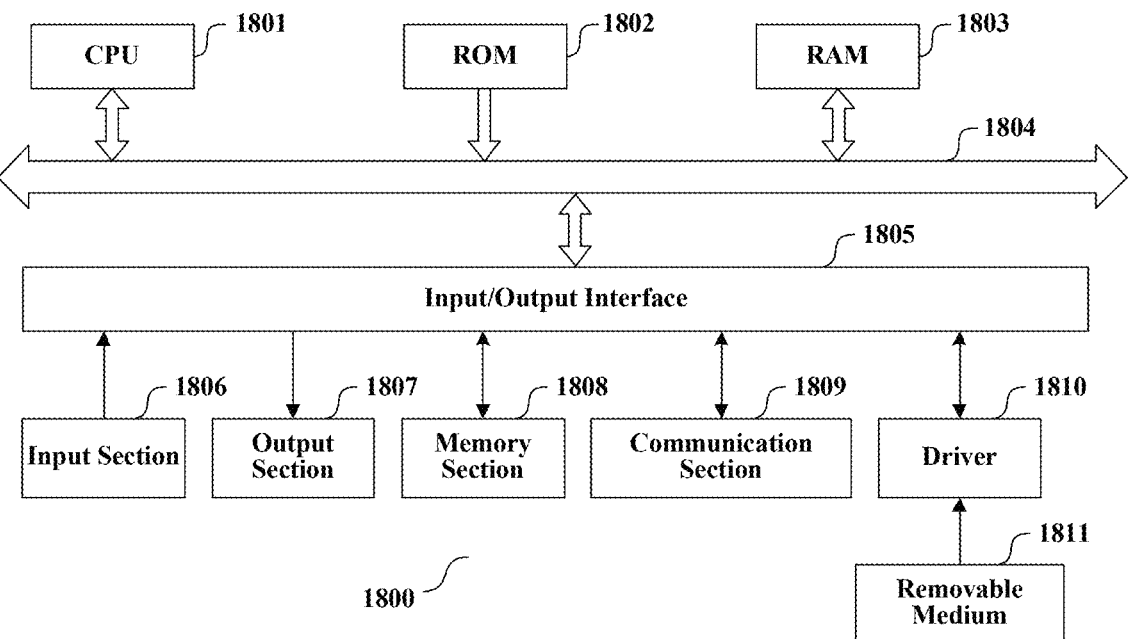
FIG. 18 is a block diagram of an exemplary block diagram illustrating the structure of a general purpose personal computer capable of realizing the method and/or device and/or system according to the embodiments of the present disclosure.

In FIG. 18, a central processing unit (CPU) 1801 executes various processing according to a program stored in a read-only memory (ROM) 1802 or a program loaded to a random access memory (RAM) 1803 from a memory section 1808. The data needed for the various processing of the CPU 1801 may be stored in the RAM 1803 as needed. The CPU 1801, the ROM 1802 and the RAM 1803 are linked with each other via a bus 1804. An input/output interface 1805 is also linked to the bus 1804.

The following components are linked to the input/output interface 1805: an input section 1806 (including keyboard, mouse and the like), an output section 1807 (including displays such as a cathode ray tube (CRT), a liquid crystal display (LCD), a loudspeaker and the like), a memory section 1808 (including hard disc and the like), and a communication section 1809 (including a network interface card such as a LAN card, modem and the like). The communication section 1809 performs communication processing via a network such as the Internet. A driver 1810 may also be linked to the input/output interface 1805, if needed. If needed, a removable medium 1811, for example, a magnetic disc, an optical disc, a magnetic optical disc, a semiconductor memory and the like, may be installed in the driver 1810, so that the computer program read therefrom is installed in the memory section 1808 as appropriate.

In the case where the foregoing series of processing is achieved through software, programs forming the software are installed from a network such as the Internet or a memory medium such as the removable medium 1811.

It should be appreciated by those skilled in the art that the memory medium is not limited to the removable medium 1811 shown in FIG. 18, which has program stored therein and is distributed separately from the apparatus so as to provide the programs to users. The removable medium 1811 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1802 and the memory section 1808 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a (n)" in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:

processing circuitry, configured to:

transmit, to user equipment, downlink reference signal resource configuration information to be used for downlink beam scanning, the downlink reference signal resource configuration information comprising information of a Transmit Receive Point (TRP) emitting a downlink emitting beam; and receive, from the user equipment, a group-based beam quality report, the group-based beam quality report being used by a network side to determine, for the user equipment, a group of downlink emitting beams which can be emitted simultaneously and can be received by the user equipment simultaneously, wherein the group-based beam quality report, received from the user equipment, includes at least one of:

(i) identifiers of respective downlink emitting beams in a beam group and an identifier of a receiving beam set used by the user equipment for receiving the beam group, or (ii) an identifier of an antenna panel of the user equipment and an identifier of a downlink emitting beam received by the antenna panel.

2. The electronic apparatus according to claim 1, wherein the information of the TRP comprises CORESETPoolIndex of the TRP.

3. The electronic apparatus according to claim 1, wherein different antenna panels of the TRP correspond to different resource sets of downlink reference signal resources respectively, so that the user equipment can determine an antenna panel emitting a downlink emitting beam corresponding to each of the downlink reference signal resources.

4. The electronic apparatus according to claim 1, wherein the processing circuitry is further configured to transmit a group beam indicator to the user equipment, and wherein the group beam indicator comprises an identifier of a receiving beam set corresponding to the group of downlink emitting beams determined by the network side for the user equipment; or wherein the group beam indicator comprises a Transmission Configuration Indicator state ID, the Transmission Configuration Indicator state ID having a predetermined correspondence with the identifier of the receiving beam set.

5. The electronic apparatus according to claim 1, wherein the processing circuitry is configured to determine, based on the group-based beam quality report, the group of downlink emitting beams, so that respective ones of the group of downlink emitting beams are emitted by different TRPs or emitted by different antenna panels of the same TRP, and received by different antenna panels of the user equipment.

6. The electronic apparatus according to claim 5, wherein the identifier of the antenna panel of the user equipment is represented by a Sounding Reference Signal Resource Set ID.

7. The electronic apparatus according to claim 5, wherein the processing circuitry is further configured to transmit a group beam indicator to the user equipment, and the group beam indicator comprises identifiers of downlink emitting beams and an identifier of an antenna panel of the user equipment for receiving the downlink emitting beam.

8. The electronic apparatus according to claim 1, wherein the processing circuitry is further configured to:

acquire, from the user equipment, information about beam quality reporting capability of the user equipment, and configure, based on the information, a beam quality report manner of the user equipment.

9. The electronic apparatus according to claim 8, wherein the beam quality reporting capability of the user equipment comprises one of the following: supporting group-based beam quality reporting manner I; supporting group-based beam quality reporting manner II; and supporting both the group-based beam quality reporting manner I and the group-based beam quality reporting manner II, wherein in the group-based beam quality reporting manner I, the group-based beam quality report at least comprises the identifiers of the downlink emitting beams in the beam group and the identifier of the receiving beam set used by the user equipment for receiving the beam group, and wherein in the group-based beam quality reporting manner II, the group-based beam quality report at least comprises the identifier of the antenna panel of the user equipment and the identifier of the downlink emitting beam received by the antenna panel.

10. The electronic apparatus according to claim 9, wherein the processing circuitry is further configured to acquire, from the user equipment, information about a maximum number of beam groups and a maximum number of beams in each group that the UE can report.

11. An electronic apparatus for wireless communications, comprising:

processing circuitry, configured to:

receive, from a network side, downlink reference signal resource configuration information to be used for downlink beam scanning, the downlink reference signal resource configuration information comprising information of a Transmit Receive Point (TRP) emitting a downlink emitting beam; and transmit, to the network side, group-based beam quality report, the group-based beam quality report being used by the network side to determine, for the user equipment, a group of downlink emitting beams which can be emitted simultaneously and can be received by the user equipment simultaneously, wherein the group-based beam quality report, transmitted to the network side, includes at least one of:

(i) identifiers of respective downlink emitting beams in a beam group and an identifier of a receiving beam set used by the user equipment for receiving the beam group, or (ii) an identifier of an antenna panel of the user equipment and an identifier of a downlink emitting beam received by the antenna panel.

12. An electronic apparatus according to claim 11, wherein different antenna panels of the TRP correspond to different resource sets of downlink reference signal resources respectively, and the processing circuitry is configured to determine the reported beam groups, so that downlink emitting beams in each beam group are emitted by different antenna panels of the TRP and received by different antenna panels of the user equipment; or the processing circuitry is configured to determine the reported beam groups, so that downlink emitting beams in each beam group are emitted by different TRPs and received by different antenna panels of the user equipment.

13. The electronic apparatus according to claim 11, wherein the processing circuitry is further configured to receive a group beam indicator from the network side, and wherein the group beam indicator comprises an identifier of a receiving beam set corresponding to the group of downlink emitting beams determined by the network side for the user equipment; or wherein the group beam indicator comprises a Transmission Configuration Indicator state ID, the Transmission Configuration Indicator state ID having a predetermined correspondence with the identifier of the receiving beam set.

14. The electronic apparatus according to claim 11, wherein the processing circuitry is configured to determine the group-based beam quality report, so that different antenna panels receive downlink emitting beams from different TRPs or downlink emitting beams from different antenna panels of the same TRP.

15. The electronic apparatus according to claim 14, wherein the processing circuitry is further configured to receive a group beam indicator from the network side, and the group beam indicator comprises an identifier of each of the group of downlink emitting beams determined by the network side for the user equipment and an identifier of an antenna panel of the user equipment for receiving the downlink emitting beam.

16. The electronic apparatus according to claim 11, wherein the processing circuitry is further configured to;

transmit information about beam quality reporting capability of the user equipment to the network side, and acquire a beam quality reporting manner configured for the user equipment from the network side.

17. The electronic apparatus according to claim 16, wherein the beam quality reporting capability of the user equipment comprises one of the following: supporting group-based beam quality reporting manner I; supporting group-based beam quality reporting manner II; and supporting both the group-based beam quality reporting manner I and the group-based beam quality reporting manner II, and wherein in the group-based beam quality reporting manner I, the group-based beam quality report at least comprises the identifiers of the downlink emitting beams in the beam group and the identifier of the receiving beam set used by the user equipment for receiving the beam group, and wherein in the group-based beam quality reporting manner II, the group-based beam quality report at least comprises the identifier of the antenna panel of the user equipment and the identifier of the downlink emitting beam received by the antenna panel.

18. A method for wireless communications, comprising:

transmitting, to user equipment, downlink reference signal resource configuration information to be used for downlink beam scanning, the downlink reference signal resource configuration information comprising information of a Transmit Receive Point (TRP) emitting a downlink emitting beam; and receiving, from the user equipment, group-based beam quality report, the group-based beam quality report being used by a network side to determine, for the user equipment, a group of downlink emitting beams which can be emitted simultaneously and can be received by the user equipment simultaneously, wherein the group-based beam quality report, received from the user equipment, includes at least one of:

(i) identifiers of respective downlink emitting beams in a beam group and an identifier of a receiving beam set used by the user equipment for receiving the beam group, or (ii) an identifier of an antenna panel of the user equipment and an identifier of a downlink emitting beam received by the antenna panel.

* * * * *